No. 763,685. Patented June 28, 1904.

UNITED STATES PATENT OFFICE.

MARK W. MARSDEN, OF PHILADELPHIA, PENNSYLVANIA.

CEMENT DERIVED FROM ASHES AND METHOD OF MAKING SAME.

SPECIFICATION forming part of Letters Patent No. 763,685, dated June 28, 1904.

Application filed August 13, 1903. Serial No. 169,366. (No specimens.)

*To all whom it may concern:*

Be it known that I, MARK W. MARSDEN, a citizen of the United States, residing at the city of Philadelphia, in the county of Philadelphia and State of Pennsylvania, have invented a certain new and useful Cement Derived from Ashes and Method of Making the Same, of which the following is a specification.

The principal object of the present invention is to provide for utilizing coal-ashes, such as are collected in towns and cities, and this is accomplished by mixing the ashes and unburned coal or cinders in a pulverized state with lime, also in a pulverized state, calcining the mixture up to a fusing temperature, and then regrinding or pulverizing the same to produce a cement. This cement may be employed in connection with broken stone, sand, and the like materials for pavings, walls, foundations, or artificial stone, and in general is available for all the uses to which Portland and other cements are put.

To practice the invention, the material which is collected under the general designation of "ashes" is freed from such articles as tin cans, paper, and the like, if present, leaving coal-ashes and considerable unburned coal.

The ashes and unburned coal or carbon, while varying in constitution, are deficient for use in making cement in respect to the amount of lime which they contain. In other words, in order to make them into a cement lime must be added and the whole heated to about the melting-point of steel or fused. The lime employed may be either the raw product or burnt lime, the former, however, being preferred. I may also employ one-third of one per cent., more or less, of chlorid of lime or its equivalent, the function of which is to absorb moisture, and thereby effect a more complete slaking of the lime. The presence of the unburned coal or carbon is not essential, but it is advantageous, because it is useful in properly calcining the cement, serving, as it does, to better distribute the heat by furnishing part of the fuel to bring the mixture to the clinkering temperature.

As an illustration, it may be said that a representative description of coal-ashes would be to say that they contain principally silicate of alumina, comparatively little lime, and various mineral oxids, sulfates, and phosphates, together with unburned coal. Therefore the ashes when pulverized and combined with a suitable admixture of powdered lime and calcined or fused to a temperature of 2,500° to 3,200° Fahrenheit, according as may be required, and finally reground or pulverized constitute an excellent cement. Different proportions may be required for coal-ashes of different kinds; but one hundred and sixty pounds of pulverized ashes containing the ordinary amount of unburned coal and from one hundred to two hundred and fifty pounds, more or less, of lime, also pulverized, the whole mixed either in a wet or dry state and calcined or fused and thereafter ground or pulverized, produce an excellent cement, and this holds true whether the ashes be deprived of their metallic contents or not, both of which are contemplated by my invention. Analyses have shown that this cement is equal to the best foreign or domestic cement.

It will be obvious to those skilled in the art to which the invention relates that modifications may be made in detail without departing from the spirit thereof. Hence I do not limit myself to the precise proportions and mode of procedure hereinbefore set forth; but,

Having thus described the nature and objects of my invention, what I claim as new, and desire to secure by Letters Patent, is—

1. In the art of cement-making, the process which consists in comminuting coal-ashes, mixing the same with pulverized lime, calcining the mixture, and thereafter reducing it to a powdered state, substantially as specified.

2. In the art of cement-making, the process which consists in comminuting coal-ashes and unburned coal, mixing the same with pulverized lime, calcining the mixture, and thereafter reducing it to a powdered state, substantially as specified.

3. In the art of cement-making, the process which consists in effecting a mixture of coal-ashes and pulverized lime, fusing the mixture, and thereafter reducing it to a powdered state, substantially as specified.

4. In the art of cement-making, the process which consists in comminuting coal-ashes and unburned coal, mixing the same with pulverized lime, fusing the mixture, and thereafter reducing it to a powdered state, substantially as specified.

5. The process of forming a cement-clinker, which consists in calcining a mixture of coal-ashes and lime, substantially as specified.

6. The process of forming a cement-clinker, which consists in fusing a mixture of coal-ashes and lime, substantially as specified.

7. The process of forming a cement-clinker which consists in calcining a mixture of comminuted coal-ashes, unburned coal, and pulverized lime, substantially as specified.

8. A cement consisting of a mixture of pulverized coal-ashes and pulverized lime, calcined and reduced to a powdered state, substantially as specified.

9. A cement consisting of a mixture of pulverized coal-ashes and pulverized lime, fused together and reduced to a powdered state, substantially as specified.

10. A cement consisting of a mixture of pulverized coal-ashes and unburned coal and pulverized lime, fused together and reduced to a powdered state, substantially as specified.

In testimony whereof I affix my signature in presence of two witnesses.

MARK W. MARSDEN.

Witnesses:
JAS. A. RICHMOND,
JOHN L. FLETCHER.